(12) United States Patent
Reinikainen et al.

(10) Patent No.: US 6,224,920 B1
(45) Date of Patent: May 1, 2001

(54) PROCESS FOR THE MANUFACTURE OF DRY BAKED PRODUCTS

(75) Inventors: Antero Reinikainen, Kotka; Sampsa Haarasilta, Kerava; Kauko Reinikainen, Kotka; Erkki Pöntinen, Kyminlinna, all of (FI)

(73) Assignee: Vaasanmylly Oy (FI)

( * ) Notice: Subject to any disclaimer, the term of this patent is extended or adjusted under 35 U.S.C. 154(b) by 0 days.

(21) Appl. No.: 09/380,550

(22) PCT Filed: Mar. 13, 1998

(86) PCT No.: PCT/FI98/00223

§ 371 Date: Sep. 2, 1999

§ 102(e) Date: Sep. 2, 1999

(87) PCT Pub. No.: WO98/41099

PCT Pub. Date: Sep. 24, 1999

(30) Foreign Application Priority Data

Mar. 17, 1997 (FI) .......................................... 971119

(51) Int. Cl.[7] ............................. A61D 8/06; A61D 13/00; A61D 11/04
(52) U.S. Cl. ............................. 426/94; 426/465; 426/497; 426/502; 426/503; 426/560
(58) Field of Search .............................. 426/94, 560, 502, 426/503, 497, 465

(56) References Cited

U.S. PATENT DOCUMENTS

| | | | |
|---|---|---|---|
| 3,770,358 | 11/1973 | Steels et al. ......................... | 425/291 |
| 4,276,800 | 7/1981 | Koppa et al. ......................... | 83/863 |
| 4,327,116 | * 4/1982 | Weith . | |
| 4,391,832 | 7/1983 | Haas, Sr. et al. .................... | 426/231 |
| 4,518,617 | 5/1985 | Haas, Sr. et al. .................... | 426/276 |
| 4,698,228 | * 10/1987 | Straka et al. ........................ | 426/446 |
| 5,176,927 | * 1/1993 | Haarasilta et al. ..................... | 426/20 |
| 5,268,187 | * 12/1993 | Quinlan ................................ | 426/496 |

FOREIGN PATENT DOCUMENTS

| | | |
|---|---|---|
| 0 289 790 | 11/1988 | (EP) . |
| 58578 | 11/1980 | (FI) . |
| 83283 | 3/1991 | (FI) . |
| 1 359 661 | 7/1974 | (GB) . |
| 421167 | 12/1981 | (SE) . |
| 442372 | 12/1985 | (SE) . |

OTHER PUBLICATIONS

Derwent's abstract, No. 86–47571/07, week 8607, Abstract of SU, 1169–584 (MOSC Food Ind Techn), Jul. 30, 1985.

* cited by examiner

*Primary Examiner*—Nina Bhat
(74) *Attorney, Agent, or Firm*—Nixon & Vanderhye P.C.

(57) ABSTRACT

The invention relates to a process for manufacturing coated or filled, dry baked products that are in the form of a ready-for-use pieces or divisible into ready-for-use pieces. In the process of the invention, a baked bread sheet is patterned for the formation of ready-for-use pieces while the starch of the bread sheet is in elastic state, the patterns being attached to one another and the bread sheet remaining continuous, whereafter the bread sheet is coated, and the coated bread sheet is divided along the patterning lines into detached products. For manufacturing filled products, a second patterned, hardened bread sheet is arranged on top of the coated bread sheet in such a way that the patterns match. The invention also relates to products obtained in this manner. Typical products of the invention comprise crispbreads, torn rusks, such as thin crispbreads, torn breadrings dried on a bread pole, and baked snacks. The invention also related to high-fibre baked snack products.

17 Claims, No Drawings

PROCESS FOR THE MANUFACTURE OF DRY BAKED PRODUCTS

This application claims benefit under 35 U.S.C. 371 National Stage Application based on PCT/FI98/00228 filed on Mar. 13, 1998.

The invention relates to a process for manufacturing coated or filled dry baked products and the like, such as crispbreads, torn rusks, for instance thin crispbreads, torn breadrings dried on a bread pole, and baked snacks. The products can be processed further, for instance, sprinkled on the surface or seasoned. With the process of the invention, products in the form of ready-for-use pieces, or products comprising a plurality of ready-for-use pieces, that are readily divisible into ready-for-use pieces are obtained. The products may be, for instance, crispbread- or thin-crispbread-based snacks.

The invention also relates to baked products manufactured with said process as well as their use for preparing further processed products.

The products according to the invention are typically wholemeal products and thus very high in fibre. Low-calorie and low-fat compositions can preferably be used as fillings/coatings. The invention allows manufacturing of products that are usable, for instance, as wholesome dietary products.

It has been observed that today the consumer desires, more and more, baked products of snack-type that are in the form of ready-for-use pieces, for instance, so called 'bite-size' products, or easily divisible into ready-for-use pieces. As regards these kinds of snack products, the aim is to obtain preferably small and thin products. In the manufacture of these products, problems have arisen from cereal ingredient.

When producing conventional, rectangular crispbread pieces, the, crispbread dough is baked in the oven as a continuous sheet or plate, and the ready-for-use pieces are formed after baking by cutting and sawing. This process has a disadvantage, for instance, that at baking step dark, scorched edges are in general formed in the dough sheet or plate that have to be cut off, and as a result product loss may be quite considerable. Product loss occurs also in connection with sawing ready-for-use pieces.

Finnish Patent 58,578 discloses a process for manufacturing crispbreads and corresponding products. In this process, breaking lines, i.e. weakening lines, permitting the breaking up of consumer pieces or serving pieces, are scored in a pre-baked product. The weakening lines are scored in the surface structure of the pre-baked product. Ready-for-use pieces are formed, for instance, by bending/breaking up in a transversal direction and sawing in a longitudinal direction. The manufacture of coated or filled products is not disclosed in this publication.

The manufacture of torn products, for instance, thin crispbreads, comprises an additional step of tearing the baked bread sheet. The torn thin crispbread sheet is divided into ready-for-use pieces after baking, and the pieces are dried and as a consequence they tend to bend/curl up.

In accordance with the prior art, filled dry baked products are in general manufactured by preparing first a filled sheet, and by separating the final ready-for-use pieces by cutting therefrom. This technique is known in relation to wafers, for instance, whereby the cutting is typically carried out by using a wire-type cutter. The wire-cutter technique is applicable to relatively soft material, such as wafers, but not to harder materials, such as crispbreads and thin crispbreads. On the other hand, the conventional sawing and cutting technique used for plain crispbreads is not applicable to filled products, since this technique, used in connection with filled products, has a negative effect on the quality of the product, and moreover, the substances used as fillings do not generally stand the heat generated by sawing. Raw material losses may also be considerable.

The manufacture of filled dry baked products is disclosed, for instance, in U.S. Pat. Nos. 4,518,617 and 4,391,832. These publications disclose the manufacture of filled wafer products, for instance, as a continuous process, whereby a layer of filling material is applied onto a wafer sheet prepared as an endless band and a second wafer sheet is arranged on top of the filling material layer. The filled wafer product in the form of a continuous sheet can then be used for making individual ready-for-use pieces, for instance, by cutting the sheet first longitudinally into narrow, continuous bands, and thereafter, by cutting these transversely into ready-for-use pieces. In the method, a particular attention has been paid to improved production capacity, reduced raw material loss and homogeneity of products.

Finnish Patent 83,283 also discloses filled wafer products and their manufacture. Confectionery bars, particularly chocolate-coated, cream-filled wafers, are manufactured in accordance with said Finnish patent. First is prepared a baked wafer sheet, onto which cream is applied, whereafter at least two cream-coated wafer sheets are cut into ready-for-use pieces. Thereafter, a coating is applied onto a product in the form of a ready-for-use piece. The method is characterized in that the wafer sheets are conveyed after baking in the oven and cooling into a curing tunnel where the cream is spread in carefully determined temperature and moisture conditions. The moisture content of the cream is also carefully determined. The vapour pressure of the cream is kept below the corresponding value of the wafers, in order that moisture may transfer from the wafers to the cream. Prepared in this way, the wafer coating will not crack or split during storage.

European Patent 682,872 discloses multi-layer snack products in which ready-for-use pieces are detached by cutting from a larger sheet.

U.S. Pat. No. 5,500,234 discloses a crispy, filled, multi-layer snack product that may be, for instance, a potato crisp. The products are characterized in that, as an isolating layer, they comprise an intervening layer of marshmallow whose function is to prevent the moisture from transferring from the filling into the crispy potato crisp or snack layer. In these products, filling/coating is applied on products that are in the form of separate, ready-for-use pieces, i.e. products are filled/coated in the form of individual pieces.

When the filling/coating is applied on products that are in the form of ready-for-use pieces, a problem arises, for instance, that the filling is not spread evenly up to the edges or filling is wasted. In addition, in coating individual pieces, high velocity is required of the equipment when pursuing reasonable production rates, which sets high requirements for the equipment. The higher the working velocity of the apparatuses, the more liable they are to malfunction.

It is essential to the process of the invention that a baked bread sheet, in the form of a continuous plate, is patterned for the formation of ready-for-use pieces while the starch in the bread sheet is in elastic state, the patterns being attached to one another and the bread sheet remaining essentially continuous. When coated products are manufactured, the coating is applied onto a patterned, hardened bread sheet while the sheet is still in the form of a continuous plate. When filled products are manufactured, a second patterned, hardened bread sheet is arranged onto a coated bread sheet in such a manner that the patterns match. The obtained product in the form of a plate is then divided along patterning lines, for instance, by breaking up into coated or filled products of one or more ready-for-use pieces.

In connection with the present invention, a hardened bread sheet refers to such a bread sheet whose starch is crystallized, non-elastic, after baking/drying.

The invention relates to a process for the manufacture of dry baked products that are in the form of ready-for-use pieces or divisible into ready-for-use pieces, in which process a dough sheet is prepared that is docked and baked in the oven, possibly torn and possibly dried.

The process is characterized by comprising following steps:

the baked bread sheet is patterned for the formation of ready-for-use pieces while the starch in the bread sheet is in elastic state, the patterns being attached to one another and the bread sheet remaining essentially continuous, the patterned, hardened bread sheet is coated, optionally after being divided into smaller parts, and p1 the coated bread sheet is divided into separate products comprising one or more ready-for-use pieces.

The manufacture of filled products comprises an additional step whereby a second patterned, possibly coated bread sheet is arranged on top of the patterned, coated bread sheet, in such a manner that the patterns match, and if desired, this step is repeated once or several times, whereafter the filled bread sheet is divided along the patterning lines into products comprising one or more ready-for-use pieces.

The patterning is preferably performed by using a patterning device provided with blades that are pressed in the bread sheet, which is in elastic state, in such a way that the blades penetrate the surface of the bread sheet and come in contact with, but do not penetrate, the bottom of the bread sheet.

In the process of the invention, the patterning step can be carried out after baking, or alternatively, in connection with drying or thereafter, it is essential that the starch contained in the bread sheet is in elastic state. The bread sheet is to be warm, typically over 60° C.

When manufacturing torn products, for instance thin crispbreads, the patterning step is carried out after baking and tearing, or alternatively, in connection with drying or thereafter, while the bread sheet is still warm. If the products are desired to be as planar as possible, the patterning is carried out preferably in connection with drying or thereafter. If it is not substantial that the product has a definite plane form, in other words, the products may be, for instance, bent or curled up, the patterning may be carried out immediately after baking in the oven.

The patterning can be carried out by cutting, deep-scoring, scoring, punching or perforating by using a patterning device provided with cutting, scoring, punching or perforating blades. In cutting, scoring and punching, continuous patterns corresponding to the size and shape of the product are pressed in the bread sheet, and in perforation the patterns pressed are dotted lines. The patterns are pressed through the crust and crumb structure of the bread sheet, even to the bottom.

In one preferred embodiment of the invention, the bread sheet is patterned into polygonal, preferably square-shaped, ready-for-use pieces. The process is particularly suitable for manufacturing small products, for instance, products measuring 4 cm by 4 cm, or even 2 cm by 2 cm.

At the patterning step, the bread sheet is preferably patterned directly to correspond with ready-for-use pieces. It is also possible to pattern the bread sheet at this step only partly, so that additional patterning into final ready-for-use pieces is performed at a later step. For instance, the process may proceed in such a way that at the first patterning step, while the bread sheet is in elastic state, the bread sheet is patterned transversely and at a later step, before coating, longitudinally. Rectangular, preferably square-shaped, ready-for-use pieces are obtained in this manner.

The division of the patterned bread sheet into ready-for-use pieces is preferably performed by bending or breaking.

The invention further relates to a product manufactured with the above-described process and the use of the product for further processing.

The invention also relates to a dry baked product which is characterized in that, on the outer circumference of the product, the crust of the baked product is essentially turned towards the bottom of the product. By the expression 'the crust is essentially turned towards the bottom of the product' it is meant that the outer circumference of the product is not 'open', as for example, in products that are divided into individual pieces by sawing after drying, but the outer circumference of the product is not completely close either, as is the case with individually baked products.

The products of the invention are preferably high-fibre snack products. Coating/filling is preferably a light coating or light filling. A light coating or light filling preferably contains light fat, and it may also contain polydextrose and/or flavourings.

The invention also relates to a high-fibre, baked snack product that is provided with low-calorie/light coating or filling. Light coating or filling preferably contains light fat, and additionally, it may also contain polydextrose and/or flavourings.

The process of the invention can be applied to all types of dry baked products. In the present invention, dry baked products refer to starchy baked products, made from grain or similar ingredients, the moisture content in products being typically in the range of about 3 to 20%, preferably about 5 to 9%. Preferably, the products are essentially planar and typically crispy products.

The products of the invention may be crispbreads, and torn or cut rusks, such as thin crispbreads or wheat rusks produced by the thin crispbread technique. The products may also be so called baked snacks, which may be crispbread- or thin-crispbread-based, for instance. The products may also be of the type of torn breadrings dried on a bread pole.

In the present invention, torn rusks refer to baked and torn products that are also toasted or dried, in general in the oven. Breadrings dried on a bread pole refer to typically thin rye breads, torn open after baking, and thereafter dried on bread poles. Baked snacks refer to starch-based products made from grain or similar ingredients, which products are ready-for-use snacks as such.

The products manufactured in accordance with the invention may be coated/filled with various coatings/fillings. So called 'sandwich' products are also comprised in the scope of the invention. Surfaces of the further processed products may be sprinkled with, for instance, poppy seeds or sesame seeds, bran or various coarsely ground materials, such as crushed nuts. The further processed products may also be seasoned on the surface, the seasonings being applied on the surface of the baked product as such or mixed with a carrier. For instance, oil or fat can be used as the carrier. Seasonings can be applied on the surface of the product, for instance, by spreading or spraying as such or mixed with a carrier, also in such a manner that the carrier is applied first and thereafter the seasonings.

The most important products of the invention comprise torn or cut rusks, for instance, wheat rusks and thin crispbreads, and crispbreads, as well as baked snacks based on these products. Torn breadrings dried on a bread pole are also important products of the invention. The process can also be applied to various pet products.

The baked products manufactured in accordance with the invention are preferably wholemeal products, most preferably rye-based products. Other applicable ingredients comprise, for instance, wheat, oat, barley, maize, rice, buckwheat and other starch-based ingredients and mixtures thereof.

In the process of the invention, a dough is prepared first with conventional methods, suitable for dry baked products. Conventionally used dough ingredients comprise flour or flour mix, water or other dough liquid, salt (in general), and possibly yeast and other additives. The ingredients are mixed into a dough and the dough is proofed by using fermentation (yeast), leavening agents (various baking powders) or beating method (ice bread).

By means of a dough brake equipment, the suitably proofed dough, is sheeted, and the dough sheet is docked, in other words, embossed. In addition to appearance, when preparing crispbread for instance, the purpose of docking is to attach the upper crust to the bottom of the bread and thus prevent the crust and bottom from detaching from one another during the baking process in the oven.

After docking, the dough sheet is baked at a carefully programmed temperature. Dry baked products are typically baked quickly at a relatively high temperature.

When torn products, such as thin crispbreads, are concerned, after baking in the oven the obtained bread sheet is torn into upper and lower halves as a continuous sheet. This results in a torn product in the form of two continuous sheets (upper rusk and lower rusk) with one torn, uneven surface and one even, untorn surface.

After baking, while the grain starch is still soft and the obtained bread sheet is in elastic state, the bread sheet is patterned for the formation of ready-for-use pieces. The bread sheet still remains as a continuous product in the form of a plate or a band. By means of patterning, weakening lines are formed in the dough/bread sheet, along which lines the product can be later divided into ready-for-use pieces. The patterning is performed by means of cutting, scoring, punching or perforating devices. The blades of the device are pressed in the bread sheet, that is still in elastic state, in such a manner that the blades penetrate the 'skinlike' crust of the bread sheet and come in contact with, but do not penetrate, the bottom of the bread sheet.

When non-torn products, such as crispbreads, are concerned, the surface of the bread sheet refers to the upper crust of the bread sheet. In torn products, patterning can be effected either on a torn surface or non-torn surface, i.e. on the crust, so the expression 'surface of the bread sheet' refers either to the crust of the bread sheet or the torn surface of the bread sheet, depending on which side the patterning is effected.

At the patterning step the blades penetrate the surface of the bread sheet and come in contact with, but do not penetrate the bottom of the bread sheet, whereby the bread sheet is still in the form of a continuous plate. The patterning mark becomes close, even 'sticks' partly together, later on when the structure solidifies, and as a consequence, the bread aromas are better preserved compared with products that are individually baked or cut into pieces by sawing.

The patterns may vary in accordance with the shape and size of the final product. Thus for instance, polygonal, for instance regularly hexagonal, or rectangular, for instance square, patterns may be effected on the bread sheet. For instance, triangular or diamond-shaped patterns may also be effected on the bread sheet. The ready-for-use pieces are attached to one another, and no waste material remains between the pieces. This kind of patterning system, in which ready-for-use pieces are attached to one another is particularly applicable in view of the coating/filling to be effected at a later step.

To produce patterns, a dough brake rotating about its axis (preferably horizontal axis) can be used, for instance, the dough brake being provided with a blade system that can produce the desired patterns. As the continuous bread sheet advances and the dough brake rotates, the blades of the dough brake press in the bread sheet the patterns of desired shape, size and depth.

An elastic backing-roll is preferably used for producing patterns.

The invention also relates to a device for patterning the bread sheet, the device comprising a roll provided with patterning blades and an elastic backing-roll.

A dough sheet is preferably patterned with a dough brake provided with a blade system enabling rectangular, preferably square-shaped, patterns. The patterns can also be produced step by step, whereby the sheet is first scored transversely, and then longitudinally, or vice versa, into rectangular patterns, most preferably into square-shaped patterns.

For rectangular, for instance square-shaped, products the patterning can be effected, for instance, in such a manner that the bread sheet is first, scored transversely, and thereafter longitudinally. The transversal scoring can be effected, for instance, with a rotating dough brake whose surface is provided with blades. The blades are arranged with even spacing at the circumference of the dough brake roller extending from one end of the roller to the other. The dough brake is arranged perpendicularly to the moving direction of the bread sheet, and the width of the dough brake roller corresponds to the width of the bread sheet. While the bread sheet moves on and the dough brake rotates, the blades of the dough brake press transverse scoring marks in the bread sheet with desired spacing. The longitudinal scores of the sheet can be produced, for instance, with devices of the type of cutting wheels placed with desired spacing at the axis arranged perpendicularly to the moving direction of the sheet. While the bread sheet moves on and the cutting wheels rotate they press continuous longitudinal scores in the bread sheet.

Another embodiment of the invention may also comprise a later additional patterning step before coating step, whereby the additional patterning is formed by cutting or sawing longitudinal, substantially precise grooves in a cooled, hardened bread sheet. At the first patterning step, the bread sheet, that is in elastic state, is patterned transversely, for instance by scoring. Rectangular, preferably square, ready-for-use pieces are obtained in this manner.

After patterning, the bread sheet is allowed to become hard, whereby starch contained in the bread sheet crystallizes. At that stage, the bread sheet also becomes crisp, so that a crisped bread sheet can be referred to. When patterns are formed after baking in the oven, the patterned bread sheet is usually dried or toasted to obtain a hardened bread sheet. In some cases, mere cooling at room temperature, for instance, may suffice. Simultaneously, the bread sheet is brought to its final moisture content. In addition to reducing the moisture content, the purpose of toasting is to give the product colour and taste. Drying and toasting are usually performed in the oven, but in regard with torn breadrings dried on a bread pole, drying can be performed on bread poles at a normal production space temperature.

If patterning is performed in conjunction with drying or thereafter, the hardening of the bread sheet takes place when the bread sheet is cooling down.

The obtained, patterned, hardened bread sheet, which may be dried or toasted, is coated with a desired coating. The coating is typically spread through coating rollers as a continuous band. Since the product to be coated is still in the form of a continuous plate or band, the coating can be spread evenly all over the ready-for-use pieces, in contrast to coating ready-for-use pieces individually. The invention enables rational operation, since one coating operation permits the treatment of a much more considerable number of products compared with the coating of products in the form of individual ready-for-use pieces. When the invention is applied, the velocity required of the equipment is considerably lower compared with the velocity of conventional filling machines used, for instance in biscuit industry, since crispbread and thin crispbread products are considerably lighter. This sets lower requirements for the equipment, and at the same time production capacity increases.

The bread sheet can be divided into smaller parts for further processing, for instance, for coating. The process may proceed, for instance, in such a way that the bread sheet is divided into longitudinal bands that are cut transversely at convenient spaces into handling pieces for coating or filling. The bands and handling pieces still remain substantially in the form of a continuous plate in which the ready-for-use pieces are still attached to one another. The bread sheet can be divided into bands or handling pieces along specific patterning lines, for instance, by providing deeper scores for the outer edges of a band/handling piece or by sawing the bands after drying into a desired size.

A wide variety of coating/filling compositions can be used in said further processed products. These comprise, for instance, creams and coatings. These may be sweet or non-sweet (e.g. savouries). Among sweet coating substances, various coatings, for instance, chocolate and chocolate-type coatings, yoghurt chocolate and jams can be mentioned. Among non-sweet savoury fillings, cheese- and ham-based fillings can be mentioned. Soursweet coatings/fillings (salsa) can also be used. Various spices or spice mixes, as such or with a carrier, can also be arranged on the surface of the products, for instance, by spreading or spraying. These comprise, for instance, dill and rainbow trout, and chilli seasonings, which can be applied on the surface of the product, for instance, by spreading or spraying, mixed with oil/fat, or in such a way that oilfat is arranged first and thereafter the seasonings.

Particularly light products are obtained by using low-calorie and low-fat coatings/fillings as coatings/fillings, such as light (yoghurt) chocolate. Light fat is preferably used as the fat component of these substances.

As regards torn products, for instance thin crispbreads, the coating/filling is preferably arranged in such a manner that the untorn, even surface of the torn product comes in contact with the filling, whereas the torn, uneven surface is outwards. This is particularly well suited for products comprising several ready-for-use pieces, since the patterning mark indicating the ready-for-use pieces shows in the final product.

If filled products are desired, a second docked, baked, and possibly torn, patterned bread sheet is arranged on top of the first obtained coated bread sheet in such a manner that the patterns match. If layered products are desired, the obtained product in the form of a plate or a band can be re-coated with the same or a different coating, and on top of this, another new bread sheet can be placed. This can be repeated several times.

The obtained coated or filled product is conveniently pressed to the effect that different layers and the coating/filling stick together, and a conveniently solid product is obtained. Only light pressing is needed.

The obtained coated or filled product, in the form of a plate or a band, is then divided into products comprising one or more ready-for-use pieces by breaking along the patterning lines. Due to the patterns, the products are easily detached from the plate by bending or breaking. The product in the form of a plate can be divided step by step, first along specific patterning lines, and then along other patterning lines, for instance, depending on whether products comprising one ready-for-use piece or a plurality of ready-for-use pieces are desired. The obtained products comprising one or more ready-for-use pieces are packaged, in most cases in light- and moisture-proof packages.

The filled or coated product in the form of a plate or a band is preferably divided into bar-like products comprising a plurality of ready-for-use pieces, for instance, 3 to 4 ready-for-use pieces. A snack product like this is readily divisible into ready-for-use pieces.

If the product comprises a plurality of ready-for-use pieces, the packed product can be divided into separate ready-for-use pieces when already packaged, for instance, using a roller system that breaks the product, for instance in the form of a bar, into ready-for use pieces along the scoring lines while the package remains intact. This method is particularly well suited for filled products.

The process of the invention enables the manufacture of thin, small, snack-type products whose typical size may be, for instance, 4×4 cm and the weight may be 2 g. When so called bite-size products are manufactured, their size may be even smaller, for instance, 2×2 cm, and the weight 0.5 g respectively. The handling of products of this size and lightness is extremely difficult, even impossible, with the known sandwich technique.

The products are in the form of individual ready-for-use pieces or easily divisible into ready-for-use pieces. The products can be consumed, for instance, as wholesome and/or savoury snacks.

The production capacity of the process of the invention is very high, permitting production of homogenous products that are evenly baked. The filled products have an even filling in the entire width and length of the product compared, for instance, with products filled in the form of individual pieces. Since the products are processed in the form of a continues sheet as long as possible, and the filling/coating can be applied evenly, the products keep straight, they do not curl up or break up. Lower velocity is required of the equipment used, compared with the processing of individual pieces. The process hygiene is also improved.

The invention also relates to products manufactured with the above-described process, and the use of these products for manufacturing further processed products.

In this connection, further processing refers to extended processing of any one of the products according to the invention. For instance, the products may be additionally coated by using any known processes. For instance, above-described coating/filling compositions can be used as coatings/fillings. The coatings may be arranged in various ways, for instance, by applying them on a plain product in a melted form or by preparing first an individual coating in a suitable mould and thereafter combining it with a high-fibre baked product of the invention.

Particularly light products are obtained by using low-calorie and low-fat light coatings/fillings, such as low-calorie (yoghurt) chocolate for coating. The fat component of these is preferably light fat.

Following examples illustrate the process and products of the invention.

EXAMPLE 1

Manufacture of Rectangular, Coated, Filled or Seasoned Crispbread or Thin Crispbread Products (A) Manufacture of Crispbread and Thin Crispbread Bands Alternative 1)

A rye-based crispbread dough was prepared in a dough mixer by combining dry and liquid ingredients. The resulting dough was passed through dough spreaders to a dough brake, in which about a two-meter-wide, continuous dough sheet was formed on a floured cloth. Top flour was spread on the surface of the dough sheet, after which the sheet was docked. The dough sheet was proofed and fed into the baking oven.

After baking in the oven, rectangular patterns of ready-for-use pieces were scored in the bread sheet, starch being in elastic state, by using a rotating dough brake provided with a blade system enabling the formation of rectangular patterns, while the bread sheet remained substantially continuous. The bread sheet was dried, after which it was divided into bands comprising a plurality of ready-for-use pieces, either by producing deeper scores at the outer edges of the band or by sawing the bands after drying to the desired width. Transversely the bands comprised, for instance, 9 ready-for-use pieces and longitudinally 30 ready-for-use pieces (in total 270 ready-for-use pieces), and the size of the ready-for-use pieces was 4×4 cm or less, 2×2 cm. However, it is possible to divide the bread sheet into bands comprising even a higher number of ready-for-use pieces.

For thin crispbread the corresponding operation was carried out after tearing.

Alternative 2)

After baking in the oven, scores in a transverse direction to the product flow were pressed in the crispbread sheet, with desired spacing (e.g. 4 cm or 2 cm). The product was dried, after which precise breaking grooves of desired depth, in the direction of the product flow, were cut by sawing with desired spaces (e.g. 4 cm or 2 cm). The product sheet was sawn and broken into bands of convenient length, the bands comprising a great number of ready-for-use pieces (for instance transversely 9 ready-for-use pieces and longitudinally 10 ready-for-use pieces).

For thin crispbread the scores were made after tearing.

(B) Sandwich Product (filled product) Prepared of Bands

Bands comprising a great number of ready-for-use pieces were supplied to a feeding machine which spread the filling onto a crispbread or thin crispbread band. A second band was applied on top of the filling, and the obtained sandwich band was lightly pressed, cooled, and thereafter, broken into ready-for-use pieces or products comprising a plurality of ready-for-use pieces. The products were packaged.

(C) Coated Product Prepared of Bands

Crispbread or thin crispbread bands were supplied to a glazing machine provided with desired coating material (e.g. cheese, chocolate). The bands were cooled and broken along the scores into ready-for-use pieces and packaged.

(D) Seasoned Product Prepared of Bands (seasoning mix applied by coating)

Crispbread and thin crispbread bands were fed into an oil spraying apparatus where seasoning oil was sprayed on them, either on one or both sides. The bands were cooled in such a manner that the oil was absorbed into the product. The bands were broken along the scores into ready-for-use pieces, and the pieces were packaged.

EXAMPLE 2

Manufacture of Square, Thin-Crispbread-Based, Baked Snacks that are Coated or Filled A rye-based thin crispbread dough was prepared in a dough mixer by combining dry and liquid ingredients. The resulting dough was passed through dough spreaders to a dough brake, in which about a two-meter-wide, continuous dough sheet was formed on a floured cloth. Top flour was spread on the surface of the dough sheet, after which the sheet was docked.

The dough sheet was proofed and baked in the oven. After baking the bread sheet was torn into an upper rusk and a lower rusk. Transversal scores were first formed in the upper rusk and lower rusk sheet by means of a rotating roller whose circumference was provided with scoring blades with the spacing of 4 cm extending from one end of the roller to the other. Thereafter longitudinal scores were formed with cutting wheels arranged with the 4 cm spacing at the axis positioned perpendicularly to the moving direction of the sheet.

A longitudinally and transversely scored thin crispbread sheet, with score marks forming square patterns, was obtained. The thin crispbread sheet provided with scores was conveyed to a toasting oven.

The thin crispbread sheet provided with scores was divided along specific scoring lines into smaller plates comprising 3×9 ready-for-use pieces. The bread sheet can also be divided into larger plates, for instance, into plates comprising 6×18 or 9×18 ready-for-use pieces. The plates were coated with chocolate cream that was applied on the plates as an even/continuous band through the coating rollers.

In manufacturing filled products, the plates divided into smaller parts (e.g. units comprising 3×9 ready-for-use pieces) were coated with melted chocolate that was applied onto the plates as a continuous band through the coating rollers. A second, similar, scored, uncoated plate was arranged on top of the coated plate in such a manner that the scores matched.

The coated or filled plate was divided by bending into units comprising three ready-for-use pieces of the size of 4×4 cm. These were wrapped into transparent packages. The product was divided into ready-for-use pieces (3 ready-for-use pieces) inside the package by conveying it through a bending device.

A readily divisible, thin-crispbread-based snack product coated or filled with chocolate was thus obtained, the product being well suited for a snack between meals, for instance.

3. Other Applications

A) High-Fibre Coated Product

A coated crispbread product of snack-type (a rye product) was manufactured, with low-calorie light chocolate used for coating. The coating was prepared by combining 'salatrim' light fat (Benefat®) with conventional components of light chocolate. A delicious light snack product was obtained.

A thin crispbread product can also be coated in the same manner. In coating substance, also other light fats can be used, for instance Olestra®. As a sweetening agent, any of the following can be used: a sweetener with conventional energy content, like sugar, e.g. saccharose, or a light sweetener, e.g. polyols, like xylitol, lactitol, isomaltitol or the like, or intensive sweeteners like aspartame or alitame possibly with polydextrose. If the desired product is a high-fibre snack containing more energy, either light or dark chocolate containing normal fat can be used as a coating.

B) High-Fibre Filled Product

A filled crispbread product (a snack-type rye product) was manufactured by using a filling containing 'salatrim' light fat (Benefat®), and as a lightener, polydextrose (Litesse®) and low-fat cheese powder and seasonings. A savoury, filled, light snack product was obtained.

A corresponding filled thin-crispbread product can be manufactured in the same manner. The filling may comprise also other light fats (e.g. Olestra®). In case the product is desired to be a high-fibre snack product containing more energy, normal fat can be used for filling instead of light fat.

C) High-Fibre, Seasoned Snack Product

A seasoning mix was applied to the thin-crispbread product by means of light fat (Benefat®). Various products were manufactured by using, for instance, salmon/dill, chicken/curry, salsa and nacho seasoning mixes. The seasonings were mixed with fat, and this seasoning and fat mixture was spread on the surface of the thin-crispbread product. A delicious snack product was obtained.

The same coating can also be used for a crispbread product of snack-type. The coating may comprise also other light fats (e.g. Olestra®). In case the product is desired to be a high-fibre seasoned snack product containing more energy, a filling/coating containing normal fat can be used as filling/coating.

When a high-fibre rye product is manufactured using light fat, the resulting product is a light snack which contains only one-third of the energy of a corresponding sandwich product provided with a filling/coating containing normal fat.

The following tables show the product information of three products of the invention, i.e. of a coated, filled and seasoned product.

1) Coated Thin Cripbread with Milk Chocolate Coating Containing 'Salatrim' Light Fat Ingredients:
 Thin crispbread: wholemeal rye flour, yeast, salt
 Milk chocolate: sugar, 'salatrim' light fat, nonfat dried milk, cocoa powder, milk, fat, lecithin and vanillin.

| Nutritional information: | | | | |
|---|---|---|---|---|
| Serving size: 120 g = 3 pieces | | | Reference product: chocolate coated cracker | |
| Calories per serving | | 120 | | 150 |
| Calories from fat | | 50 | | 75 |
| | per serving | | per serving | |
| Total fat | 5 | g | 8 | g |
| saturated fat | 5 | g | 5 | g |
| Cholesterol | 0 | mg | 0 | mg |
| Sodium | 45 | mg | 45 | mg |
| Total carbohydrate | 17 | g | 16 | g |
| dietary fibre | 1 | g | <0.5 | g |
| sugars | 13 | g | 13 | g |
| Protein | 2 | g | 2 | g |

2) Filled Thin Crispbread (Sandwich Product) with Cheddar Filling with 'Salatrim' Light Fat and Polydextrose Ingredients:
 Thin crispbread: wholemeal rye flour, yeast, salt
 Cheddar filling: Cheddar cheese powder, 'salatrim' light fat, polydextrose, Edam-Emmenthal cheese powder

| Nutritional information: | | |
|---|---|---|
| Serving size: 25 g = 1 sandwich (3 bits) | Reference product: filled cracker | |
| Calories per serving | 100 | 140 |
| Calories from fat | 50 | 90 |
| | per serving | per serving |
| Total fat | 6 g | 10 g |
| saturated fat | 5 g | 7 g |
| Cholesterol | 9 mg | 9 mg |
| Sodium | 100 g | 100 g |
| Total carbohydrate | 9 g | 8 g |
| dietary fibre | 2 g | <0.5 g |
| sugars | <0.5 g | <0.5 g |
| Protein | 4 g | 4 g |

3) Seasoned Thin Crispbread

Ingredients:
 Wholemeal rye flour, coconut fat, seasonings, yeast, salt

| Nutritional information: | | |
|---|---|---|
| Serving size: 25 g = 11 pieces | Reference product: potato crisp | |
| Calories per serving | 100 | 130 |
| Calories from fat | 40 | 70 |
| | per serving | per serving |
| Total fat | 4 g | 8 g |
| saturated fat | 3 g | 2 g |
| Cholesterol | 0 mg | 0 mg |
| Sodium | 200 mg | 160 mg |
| Total carbohydrate | 12 g | 12 g |
| dietary fibre | 3 g | 2 g |
| sugars | <1 g | <0.5 g |
| Protein | 2 g | <1 g |

The above general description of the invention and examples thereof are intended for illustrating the present invention, and they are by no means intended to restrict the invention. The invention relates to all other modifications in the spirit and within the scope of the invention, the modifications being possible and obvious to one skilled in the art.

What is claimed is:

1. A process for the manufacture of coated dry baked products in the form of ready-for-use pieces or divisible into ready-for-use pieces, in which a dough sheet is prepared that is docked and baked in the oven, optionally torn or dried, wherein the process comprises following steps:
 the baked bread sheet is patterned for the formation of ready-for-use pieces while the starch in the bread sheet is in elastic state, the patterns being attached to one another and the bread sheet remaining essentially continuous, the patterned, hardened bread sheet is coated, optionally after being divided into smaller parts, and the coated bread sheet is divided along the patterning lines into separate products comprising one or more ready-for-use pieces.

2. A process as claimed in claim 1 for manufacturing filled baked products, wherein the process additionally comprises a step, in which a second patterned, or coated bread sheet is arranged on top of the patterned, coated bread sheet, in such a manner that the patterns match, optionally this step is repeated once or several times, and the filled bread sheet is divided along the patterning lines into products comprising one or more ready-for-use pieces.

3. A process as claimed in claim 1, wherein the patterning of the bread sheet is performed by using a patterning device provided with blades that are pressed in the bread sheet, which is in elastic state, in such a way that the blades penetrate the surface of the bread sheet and come in contact with, but do not penetrate, the bottom of the bread sheet.

4. A process as claimed in claim 1, wherein the bread sheet is patterned to correspond with ready-for-use pieces.

5. A process as claimed in claim 1, wherein the patterning of the bread sheet is carried out after baking and optionally tearing.

6. A process as claimed in claim 1, wherein the patterning of the bread sheet is carried out in connection with drying or thereafter.

7. A process as claimed in claim 1, wherein the patterning of the bread sheet is carried out by cutting, scoring, punching or perforating.

8. A process as claimed in claim 1, wherein the division into ready-for-use pieces is performed by bending or breaking.

9. A process as claimed in claim 1, wherein the bread sheet is patterned into rectangular, or square, shapes.

10. A process as claimed in claim 9, wherein the bread sheet is patterned into square shapes having sides that measure between 2–5 centimeters.

11. A process as claimed in claim 1, wherein the process comprises an additional patterning step before coating step.

12. A process as claimed in claim 11, wherein the bread sheet is patterned into rectangular, or square, shapes by patterning the bread sheet transversely at the first patterning step, and longitudinally at the additional patterning step.

13. A process as claimed in claim 12, wherein the longitudinal patterning at the additional patterning step is performed by sawing grooves.

14. A dry baked product, being manufactured by process in accordance with claim 1.

15. A baked product as claimed in claim 14, being selected from a crispbread, torn or cut rusk, or as thin crispbread, or a breadring dried on a bread pole, or a baked snack product.

16. A process as claimed in claim 10, wherein on the outer circumference of the bread sheet the crust of the baked product is essentially turned towards the bottom of the product.

17. A process as claimed in claim 1, wherein the bread sheet is divided into bar-shaped products that are broken up in packages into detached ready-for-use pieces.

* * * * *

UNITED STATES PATENT AND TRADEMARK OFFICE
CERTIFICATE OF CORRECTION

PATENT NO. : 6,224,920 B1
DATED : May 1, 2001
INVENTOR(S) : Reinikainen et al.

Page 1 of 1

It is certified that error appears in the above-identified patent and that said Letters Patent is hereby corrected as shown below:

<u>Title page,</u>
Item [86], delete "PCT No.: PCT/FI98/00223" and insert
-- PCT No. PCT/FI98/00228 --.

Item [87], delete "PCT Pub. Date: Sep. 24, 1999" and insert -- PCT Pub. Date: Sep. 24, 1998 --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*